United States Patent
Wang et al.

(10) Patent No.: US 9,725,567 B2
(45) Date of Patent: Aug. 8, 2017

(54) ADDUCT THERMOSETTING SURFACING FILM AND METHOD OF FORMING THE SAME

(75) Inventors: Qiang Wang, Irvine, CA (US); Ito Akihiro, Irvine, CA (US); Paul Kyle, Irvine, CA (US); Augusto Arakaki, Irvine, CA (US); Catalina Gutierrez, Irvine, CA (US)

(73) Assignee: Mitsubishi Chemical Carbon Fiber and Composites, Inc., Irvine, CA (US)

( * ) Notice: Subject to any disclaimer, the term of this patent is extended or adjusted under 35 U.S.C. 154(b) by 273 days.

(21) Appl. No.: 13/288,888

(22) Filed: Nov. 3, 2011

(65) Prior Publication Data

US 2012/0115990 A1    May 10, 2012

Related U.S. Application Data

(60) Provisional application No. 61/409,692, filed on Nov. 3, 2010.

(51) Int. Cl.
| | | |
|---|---|---|
| *C08J 5/18* | (2006.01) | |
| *C08G 59/38* | (2006.01) | |
| *C08G 59/22* | (2006.01) | |
| *C08G 59/42* | (2006.01) | |
| *C08L 63/00* | (2006.01) | |
| *C08L 63/04* | (2006.01) | |
| *C08L 63/02* | (2006.01) | |

(52) U.S. Cl.
CPC .............. *C08J 5/18* (2013.01); *C08G 59/38* (2013.01); *C08G 59/4246* (2013.01); *C08L 63/00* (2013.01); *C08J 2309/02* (2013.01); *C08J 2363/02* (2013.01); *C08J 2363/04* (2013.01)

(58) Field of Classification Search
USPC .............. 523/400, 427, 457, 458, 468, 466; 427/398
See application file for complete search history.

(56) References Cited

U.S. PATENT DOCUMENTS

| | | | | |
|---|---|---|---|---|
| 3,894,112 | A * | 7/1975 | Pagel .............................. | 428/107 |
| 4,751,129 | A * | 6/1988 | Ramalingam et al. ..... | 428/195.1 |
| 5,384,345 | A * | 1/1995 | Naton ............................ | 523/218 |
| 6,919,398 | B1 * | 7/2005 | Born ..................... C04B 20/008 | |
| | | | | 524/492 |
| 2006/0182949 | A1 * | 8/2006 | Salnikov et al. ............. | 428/327 |
| 2007/0095475 | A1 * | 5/2007 | Hable et al. .................. | 156/330 |
| 2007/0232727 | A1 * | 10/2007 | Lin ........................ B82Y 30/00 | |
| | | | | 523/440 |
| 2008/0145564 | A1 * | 6/2008 | Allam et al. .................. | 427/514 |

FOREIGN PATENT DOCUMENTS

| | | | |
|---|---|---|---|
| JP | 2010131888 A | * | 6/2010 |
| WO | WO 2009058295 A2 | * | 5/2009 |

OTHER PUBLICATIONS

Momentive Product Selector, "EPON and EPI-REZ Epoxy Resins," copyright 2012, pp. 5-8.*
Dow Product Information, "DEN 438," created Jul. 21, 2009 at http://msdssearch.dow.com/PublishedLiteratureDOWCOM/dh_02dc/0901b803802dc73f.pdf?filepath=epoxy/pdfs/noreg/296-01443.pdf&fromPage=GetDoc, pp. 1-2.*
Emerald Performance Materials, "Hypro Carboxyl-Functionoal Polymers (formerly Hycar CTBN)," p. 1-2.*
Cabot Datasheet, "Cab-O-Sil TS-720," p. 1-2.*

* cited by examiner

*Primary Examiner* — Randy Gulakowski
*Assistant Examiner* — Ha S Nguyen
(74) *Attorney, Agent, or Firm* — Morgan, Lewis & Bockius LLP

(57) ABSTRACT

In various embodiments, the invention provides an in-situ adduct formed by reacting liquid, solid, and/or semi-solid epoxy resins with a di-carboxylic acid functionalized polymer. The adducting process at least doubles the viscosity of the mixture. A hot melt thermosetting surfacing film and composite formed using the adduct are also disclosed. Methods of preparing and using are also disclosed.

17 Claims, No Drawings

ADDUCT THERMOSETTING SURFACING FILM AND METHOD OF FORMING THE SAME

CROSS-REFERENCE TO RELATED APPLICATIONS

This application claims priority to U.S. Provisional Patent Application No. 61/409,692, filed on Nov. 3, 2010, the disclosure of which is incorporated herein in its entirety for all purposes.

BACKGROUND OF THE INVENTION

Field of the Invention

This invention relates, in general, to an adduct of one or more resins and a functionalized polymer and in various aspects to a hot melt thermosetting surfacing film and methods for their preparation and use.

Description of Background Art

Conventional painting processes for cured composite parts require undesirable, repeated sand-fill-sand steps to prepare the surface before applying the paint primer. The process is time-consuming and leads to high labor costs. A surfacing film, which applied at the time of layup and molding of the composite part, provides a ready-to-prime, smooth, and porosity or pinhole-free protecting surface (either with light scuff sanding or without sanding) for a composite laminate can significantly simplify the surface preparation for painting.

High viscosity and controlled flow are generally important for preparing a good surfacing film. Currently, mainly two approaches are used to increase the viscosity and reduce the flow of the film. One is by using high molecular weight raw materials, such as high molecular weight resin or rubber (e.g., high molecular weight/high melting point solid epoxy resin). The other approach calls for adding various fillers with high filler loadings. High filler loading contributes to good sanding properties of the cured film and low print-through or readout of the underlying fiber, honeycomb core, woven laminate or other surface pattern. However, existing techniques for increasing viscosity also have significant negative impact on the resin mixing and film coating processes. For example, it is difficult to make light-weight or thin film with a high viscosity resin especially in a hot melt process.

One of the concerns arising when using high molecular weight materials or high loading of fillers to raise the viscosity of the resin is that the resulting film might be too dry. The material likely will not have ideal tack at room temperature, thus making layup difficult if the film will not adhere to other layers during the layup process. Furthermore, such a material will have inadequate drapability. Both of these features make the material less desirable from a processability standpoint. For some commercial products it is difficult or nearly impossible to process such high molecular weight materials using the hot melt method due to ultra high viscosity of these materials. To overcome these difficulties, a solvent process, therefore, must be used.

Besides inducing high viscosity that causes poor processability, high filler loading also negatively affects mixing of and coating with the resin. High molecular weight and high filler loading also tend to have significant negative impact on the cured film physical properties, e.g., toughness and adhesion strength.

Currently there are two primary methods to make films: (1) a solvent process, and (2) a hot melt process. In a solvent process, processability is less of a problem with high viscosity systems, either due to high molecular weight material and/or high filler loadings because more or less solvent can be added to the system to adjust the viscosity to achieve good mixing of ingredients and allow good impregnation of the substrate with the solvated resin. In many cases, however, a hot melt process is preferred over the solvent process due to the material costs and environmental concerns associated with using a volatile solvent. Since the residual solvent is volatile, it can cause problems such as porosity/fish eye (craters), orange peel, sag, and the like. Attempts to remove residual solvent by application of higher temperatures or longer heating times can lead to over drying and negatively affect film properties such as tack and drape. In addition, a solvent process-derived product tends to have residual solvent(s) in the product, which can outgas during cure and form cosmetic defects requiring additional rework/repair. On the contrary, a hot melt process requires the resin components to have a relatively low viscosity. It is difficult to adjust the raw input materials for easier hot melt processing while still achieving a resulting product with desirable performance.

In light of the foregoing, it would be beneficial to have resin compositions and methods of using these compositions which overcome the above and other disadvantages, producing films with desirable properties.

BRIEF SUMMARY OF THE INVENTION

In various embodiments the invention provides an adduct and a thermosetting surfacing film formed from this adduct. In an exemplary embodiment, the adduct is formed by the mixing or reaction of a resin with a polymer. In an exemplary embodiment, the resin is an epoxy resin. In various embodiments, the polymer is a carboxylic acid functionalized polymer. In an exemplary embodiment, the adduct is formed by reacting an epoxy resin with a carboxylic acid polymer. In various embodiments, the surfacing film is configured for use in a hot melt process. An exemplary adduct is a hot melt thermosetting surfacing composition. The surfacing film can be used in various composite material applications including, but not limited to, vacuum bag molding, pressure bag molding, autoclave molding, hydraulic press molding, resin transfer molding (RTM), infusion/injection molding, and the like.

In various embodiments, the invention provides a hot melt thermosetting surfacing film composition including an adduct formed by reacting one or more liquid, solid, and/or semi-solid epoxy resins with a carboxylic acid functionalized polymer. In various embodiments, the carboxylic acid functionalized polymer includes with one or more carboxylic acid functional groups per molecule. In various embodiments, at least about 50%, 60%, 70%, 80%, 90% or about 100% of the monomeric units in the polymer include at least one carboxylic acid moiety. In an exemplary embodiment, the adducting process increases the viscosity of the resin, e.g., at least about two-fold. In various embodiments, the adduct is formed in-situ before adding other resins, fillers, a curing agent, and a catalyst to form the final formulation.

Various aspects of the invention relate to a thermosetting surfacing film composition made from a reactant mixture of cross-linkable resins, the mixture including: (A) from about 5% to about 60% (by weight of the total resin composition) of a liquid, semi-solid, or mixture of an epoxy resin comprising at least one low viscosity liquid epoxy resin, (B) from about 2% to about 40% (by weight of the total resin composition) of one or more solid bis-phenol A based epoxy resins having a softening point range from about 50° C. to about 130° C., (C) from about 1% to about 30% (by weight of the total resin composition) of solid epoxy phenol novolac, epoxy cresol novolac or other multifunctional epoxy having a functionality of about 2.2 or more, (D) from about 1% to about 20% (by weight of the total resin composition) of a functionalized polymer, (E) optionally from about 0.001% to about 5% (by weight of the total resin composition) of a defoamer and/or air release agent, (F) from about 20% to about 60% (by weight of the total resin composition), with or without an organic surface treatment, of a filler material comprising one or more (e.g., one, two or three) fillers and/or pigments, the filler material including: (i) a member selected from silica, alumina, aluminum hydroxide, magnesium oxide, zinc borate, zinc-magnesium complex, ceramics, high melting thermoplastic polymer powders, zinc stannate based compounds, antimonite trioxide, carbon black, titanium dioxide, ground glass, milled or chopped fiber, glass spheres, hollow glass beads, whiskers, minerals, calcium carbonate or a combination thereof.

In an exemplary embodiment, the thermosetting surfacing film of the invention has an average particle size from about 5 nm to about 100 microns, (G) from about 2% to about 30%, e.g., about 10% (by weight of the total resin composition) of a curing agent (e.g., dicy, 3,3'-diaminodiphenyl sulfone (3,3'-DDS), 4,4'-diaminodiphenyl sulfone (4,4'-DDS), 3,4'-diaminodiphenolmethane (3,4'-DDM), or 3,4'-diaminodiphenolmethane (3,4'-DDM), (H) from about 0.5% to about 5% (by weight of the total resin composition) of a hardener such as phenol functional hardeners, Dicy, an amine, Lewis Acid hardeners and the like, and (I) an optional accelerator or catalyst, e.g., one or more selected from urea, substituted urea, imidazole, substituted imidazole, amine (e.g., primary, secondary, or tertiary substituted or unsubstituted amine).

In some applications, flame retardancy is desired or required for a surfacing film. In an exemplary embodiment, the invention provides a flame retardant surfacing film. In various embodiments, the film is made by including a flame retardant agent in the adduct forming the film. In an exemplary embodiment, a flame retardant surfacing film is prepared by partially or fully replacing one or more of the liquid, semi solid or solid epoxy resins with a flame retardant agent and in combination with some of the filler materials substituted with flame retardant fillers. In an exemplary embodiment, the flame retardant agent is a member selected from bromine or phosphorous containing aromatic epoxies, high-nitrogen, low-hydrogen containing polymers such as benzoxazines, another inorganic or organic flame retardants while fillers can be a member selected from a number of FR additives, smoke suppressors and char formers. Exemplary inorganic flame retardants of use in the films of the invention include, but are not limited to, aluminum hydroxide or other hydrated mineral compounds, e.g., magnesium hydroxide, magnesium oxide, zinc borate, borates, phosphate esters, antimony compounds, phosphorous containing reactive flame retardant, or a combination thereof. In exemplary embodiments, the inorganic solid powders, e.g., aluminum hydroxide act as both flame retardant and filler.

In various embodiments, the desirable properties of the film are achieved or augmented by the addition to the adduct of one or more members selected from smoke suppressants and char formers, such as antimony oxide and zinc borate.

In some applications, such as rapid cure, large composite parts manufacturing, fast cure is required for high productivity requirement, where typical composite cure methods may not be acceptable due to cycle time. For use in such applications, in various embodiments, this invention provides fast cure surfacing film. In an exemplary embodiment, the invention provides a fast cure surfacing filme can be achieved by selecting different curing agent from the class of compounds, though not limited to, phenolic compounds, Dicy, DDS and the like, and catalyst, from the class of compounds, though not limited to imidazoles, amines, and substituted/modified amines and the like. By adjusting the concentration of the curing agent and catalyst in the formulation without sacrificing cured surface quality/cosmetics, the composition is amenable to all methods of composite cure, including rapid cycle times to reduce part production cost through higher throughput rates.

Various aspects of the invention relate to an adduct formed by reacting liquid, solid, and/or semi-solid epoxy resins with a di-carboxylic acid functionalized polymer. In various embodiments, the resulting adduct is mixed with one or more of a filler, a pigment, a defoamer, a curing agent, and a catalyst. In various embodiments, the reactant mixture is cured to form a thermosetting film.

The compositions and methods of the present invention(s) have other features and advantages which will be apparent from or are set forth in more detail in the following Detailed Description of the Invention, which serves to explain the principles of the present invention(s) by way of presenting certain exemplary embodiments, which are not to be construed as limiting

DETAILED DESCRIPTION OF THE INVENTION

Reference will now be made in detail to various embodiments of the invention. While the invention will be described in conjunction with these various embodiments, it will be understood that they are not intended to limit the invention to those embodiments. On the contrary, the invention encompasses alternatives, modifications and equivalents, which may be included within the spirit and scope of the invention as defined by the appended claims.

For convenience in explanation and accurate definition in the appended claims, the terms "up" or "upper", "down" or "lower", "top" and "bottom", "inside" and "outside", and "upstream" and "downstream" are used to describe features of the present invention with reference to the positions of such features as displayed in the figures.

In various embodiments, the invention provides a composition or reactant mixture for a thermosetting surfacing film. In various aspects, the surfacing film is configured for use in a hot melt process. The surfacing film can be used in various composite material applications including, but not limited to, vacuum bag molding, pressure bag molding, autoclave molding, hydraulic press molding, resin transfer molding (RTM), infusion/injection molding, and the like.

In various embodiments, the composition of the invention relates to a hot melt thermosetting surfacing film formed from an adduct prepared by reacting liquid, solid, and/or semi-solid epoxy resins with a carboxylic acid functionalized polymer. The exemplary adducting process increases, e.g., approximately doubles the viscosity of the mixture. In various embodiments, the adduct is formed in-situ. In various embodiments, the carboxylic acid functionalized polymer is a di-carboxylic acid functionalized polymer. In various embodiments, the functionalized polymer is reactive with at least one of the epoxy resins.

Exemplary compositions of the invention include one or more carboxylic acid polymer with a functionality of at least about 2 carboxylic acid (or carboxylic acid derived) moieties per molecule. Exemplary functionalized polymers include conventional diene and olefin polymers having, or modified to include, from about 0.1 to about 5 wt %, preferably from about 0.5 to about 3 wt % carboxyl, carboxamide, anhydride, epoxy, or amine functionality. In exemplary embodiments, particular functional groups should be capable of reacting with at least one of the resin system monomers. Representative of such diene polymers are the variety of well known rigid possibly cross-linked copolymers of butadiene or isoprene including for example the diene-acrylonitrile copolymers widely available as nitrile rubbers, copolymers of vinyl aromatic monomers and diene monomers such as the styrene-butadiene copolymers known as SBR rubbers, and terpolymers of dienes with acrylonitrile and styrene or vinyl toluene, all of which, when modified with the desired level of functionality, may be described as functionalized diene rubbers. Many such rubbers having $T_g$ values below 10° C. and the desired functionality are readily available from commercial sources. Also useful are rubbery copolymers of acrylate esters with carboxyl functionality, which may be described as carboxylated acrylic rubbers. Acrylic polymers with the desired level of carboxylic functionality and having $T_g$ values in the range of about −25° C. to about 10° C. are also commercially available in a variety of forms. Other polymers which may be similarly modified to include carboxyl or other functionality include rubber-like copolymers and particularly graft copolymers of styrene, vinyltoluene or the like and optionally one or more additional copolymerizable vinyl monomers on a rubbery polymeric substrate, using a sufficiently high level, preferably greater than 60 wt %, of the rubbery substrate component. Specific examples include rubbery acrylonitrile-butadiene-styrene (ABS) polymers, methylmethacrylate-butadiene-acrylonitrile-styrene (MABS) polymers and the like.

Modification of polymers to include carboxyl functionality may be accomplished by a variety of well known processes, including copolymerizing monomers with a suitable copolymerizable carboxylic monomer or by grafting the preformed polymer in solution, suspension, or latex form, with carboxylic compounds such as maleic anhydride, maleimide, acrylic acid, itaconic acid or the like. Other methods for providing carboxylated polymers having the necessary character include grafting the polymers in particle form with mixtures of a monomer and a copolymerizable carboxylic or other functional unsaturated compound to provide particles having a relatively rigid outer shell with reactive carboxylic or other functionality, and many such core-shell particulate modifiers are also known and commercially available. Also suitable are post reaction processes for functionalizing diene copolymers, olefins and the like, as recently described in U.S. Pat. Nos. 4,740,552 and 4,654,405.

Exemplary base resin systems useful in the subject invention comprise epoxy resins. Epoxy resins are well known to those skilled in the art, and require no further description. The functionality of such resins are generally two or higher, and preferred epoxy resins are the glycidyl derivatives of bisphenol A, bisphenol F, phenolated dicyclopentadiene oligomers, aminophenols, tri- and tetraphenylolalkanes, and methylenedianiline. The epoxy resins are generally used with a curing agent which may be, for example, a phenol, dicyandiamide, anhydride or an aromatic amine, e.g., 3,3'- and 4,4'-diaminodiphenyl-sulfone. Catalysts may be used to accelerate the curing reaction, and other comonomers, thermoplastics both dissolved and dispersed, and other additives, for example those required for flow control, may be added.

Various aspects of the invention relate to a reactant mixture, also referred to as a "mixed resin composition" or "resin composition", for forming a thermosetting surfacing film. The mixed resin composition generally refers to a reactant mixture before being applied to the reinforcing web as a film product. In various respects, the resin composition includes an adduct, formed by reacting epoxy resin or resins and a functionalized polymer, and various optional fillers, additives, and the like. Various aspects of the invention relate to a resulting surfacing film composition for use in composite applications. In some aspects, the term "composition" refers to the resin composition and the resulting film somewhat interchangeably.

In various embodiments, the resin composition is formed from cross-linkable resins. The resin composition includes liquid, semi-solid, or solid of an epoxy resins combined with a functionalized polymer. In various embodiments, the epoxy resins include at least one low viscosity liquid epoxy resin, one or more solid bis-phenol A based epoxy resins, and a solid epoxy phenol novolac, epoxy cresol novolac, or other multifunctional epoxy. "Multifunctional epoxy" is to be understood as used in the materials art and in various aspects means a material with a functionality greater than 2 or of a sufficient amount to increase crosslink density and $T_g$ performance. "Functionality" as used in this context refers to the number of epoxide moieties present on the molecule.

In various embodiments, the resin composition further includes a defoamer and/or air release agent, a filler material, a curing agent, and optionally an accelerator or catalyst. In various embodiments, the filler material includes one or more inorganic fillers and/or pigments.

The resin composition may include the contents described herein in various combinations. The resin composition may include from about 1% to about 20% (by weight of the total resin composition) of a carboxylic acid functionalized polymer. The resin composition may include from about 5% to about 60% (by weight of the total resin composition) of an epoxy resin including at least one low viscosity liquid epoxy resin. The resin composition may include from about 2% to about 40% (by weight of the total resin composition) of one or more solid bis-phenol A based epoxy resin. In various embodiments, the solid bis-phenol A based epoxy resin has a softening point range from about 50° C. to about 130° C. The resin composition may include from about 1% to about 30% (by weight of the total resin composition) of solid epoxy phenol novolac, epoxy cresol novolac, or other multifunctional epoxy. In various embodiments, the novolac or multifunctional material has a functionality selected from about 4.5 or more, about 3 or more, and about 2 or more. In various embodiments, the novolac or multifunctional material has a functionality of about 2.2 or more.

In various embodiments, the resin composition includes a total amount of the above liquid epoxies, solid epoxies, carboxylic acid functionalized polymer adduct in the range from about 19.5% to about 89.5% (by weight of the total resin composition). In an exemplary embodiment, the resin composition includes from about 0.001% to about 5% (by weight of the total resin composition) of a defoamer and/or air release agent. In various embodiments, the resin composition includes from about 10%, about 20%, about 30%, about 40%, about 50%, about 60%, about 70% to about 80% (by weight of the total resin composition), with or without an organic surface treatment, of a filler material optionally including one, two, three, or more fillers and/or pigments. In various embodiments, the resin composition includes from about 2% to about 10% (by weight of the total resin composition) of a curing agent. Exemplary resin compositions include from about 0.5% to about 1%, to about 1.5%, to about 2%, to about 2.5%, to about 3%, to about 3.5%, to about 4%, to about 4.5% to about 5% or more (by weight of the total resin composition) of an accelerator or catalyst.

In various embodiments, the mixed resin component has a relatively medium or relatively low viscosity that makes it easy to mix and coat the thin film with precise thickness control. According to these embodiments, the composition prior to curing has a viscosity between about 20 Pa·s and about 200 Pa·s, e.g., between about 30 Pa·s to about 180 Pa·s, e.g., from about 40 Pa·s to about 160 Pa·s, e.g., from about 60 Pa·s to about 140 Pa·s, e.g., from about 80 Pa·s to about 120 Pa·s, In an exemplary embodiment, the viscosity of the resin is at least about 20, at least about 40, at least about 60, at least about 80, at least about 100, at least about 120, at least about 140, at least about 160, at least about 180 or at least about 200 Pa·s. In various embodiments, the viscocity of the resin is less than about 200, less than about 180, less than about 160, less than about 140, less than about 120, less than about 100, less than about 80, less than about 60, less than about 40 or less than about 20 Pa·s.

In various embodiments, the epoxy resin component is a blend of epoxy resins selected to provide tack, viscosity, Tg after cure, and/or toughness. One will understand from the description herein that a variety of resins may be blended to achieve different processing advantages and/or field performance.

In various embodiments, the resin component includes a solid epoxy phenol novolac and/or epoxy cresol novolac and/or other multifunctional resins having an average functionality of about 1.4, 1.6. 1.8, 2.0 or 2.2 or more. "Average functionality" is to be understood as used in the materials and composites industries and generally refers to the number of reactive functional groups, e.g., epoxides, per molecule for the individual resin ingredient additive prior to adding it to the mixed resin composition. For example, one molecule may have one functional group whereas another molecule has two functional groups so the "average functionality" is 1.5. Moreover, one will appreciate that the actual average functionality may differ from the theoretical number. For example, some oligomerization or polymerization may occur during formation of the resin ingredient or mixture (dimers, trimers, tetramers, etc.) as homopolymerization or copolymerization of any ingredients.

The epoxy resins of use in the invention have good stability at room temperature, which provides better handling and process flexibility. In part, this allows the resins to be exposed to ambient conditions for an extended time before cure without deterioration of the performance of the final product.

Suitable thermosetting resins include, but are not limited to, monomers, oligomers, and/or polymeric materials, which contain at least one or more reactive functional group in each molecule. Suitable thermosetting resin materials can include, but are not limited to, mixtures or hybrids of epoxy resin, phenolic formaldehyde resins, urea formaldehyde resin, acrylic resin (acrylate), polyester resin (unsaturated), vinyl ester resin, cyanate ester resin, melamine resin, benzoxazine resin, bismaleimide resin, Bismaleimide Triazine (BT) Resin and polyimide resin. Thermoplastic additives may also be added to enhance toughness properties. Similarly, combinations or substitutions of flame retardant fillers or FR resin additives may be used or changed to enhance flame retardance properties for different end-use or application requirements.

Suitable low viscosity liquid epoxy resins include, but are not limited to, bis-phenol A type epoxy resins, bis-phenol F type epoxy resins, and blends of the same. Suitable bis-phenol A epoxy resins include, but are not limited to liquid, solid, and semi-solid bis-phenol A epoxy resin.

Suitable liquid bis-phenol A type epoxy resins include, but are not limited to those sold by Dow Chemical Company, Momentive Performance Materials, Inc. (formerly Hexion Specialty Chemicals, Inc.), Huntsman International LLC, and Emerald Performance Materials LLC. Suitable solid bis-phenol A type epoxy resins include, but are not limited to, those sold by Dow Chemical Company, Momentive Performance Materials, Inc. (formerly Hexion Specialty Chemicals, Inc.), Huntsman International LLC, and Emerald Performance Materials LLC. Suitable bis-phenol F type epoxy resins include, but are not limited to those sold by Dow Chemical Company (e.g., bis-phenol F type), Momentive Performance Materials, Inc. (formerly Hexion Specialty Chemicals, Inc.), Huntsman International LLC, and Emerald Performance Materials LLC. Suitable blends include, but are not limited to, blends of bis-phenol A type and bis-phenol F type epoxy such as those sold by, but not limited to Dow Chemical Company, Huntsman International LLC, and Emerald Performance Materials LLC.

Suitable multifunctional epoxies include, but are not limited to, semi-solid multifunctional epoxies. Suitable semi-solid multifunctional epoxies include, but are not limited to, multifunctional phenol novolac epoxy resin, bis-phenol A type novolac epoxy resin, bis-phenol F type novolac epoxy resin, tetrafunctional epoxy resin, and cresol novolac epoxy resin such as those sold by companies such as Dow Chemical Company, Momentive Performance Materials, Inc. (formerly Hexion Specialty Chemicals, Inc.), Huntsman International LLC, and Emerald Performance Materials LLC. Other multifunctional epoxy resin materials may be used such as trifunctional and tetrafunctional epoxy resin such as those sold by Momentive Performance Materials, Inc. (formerly Hexion Specialty Chemicals, Inc.), Huntsman International LLC, and Emerald Performance Materials LLC.

In various embodiments, a reactant for making the adduct is a functionalized polymer. In various embodiments, the polymer is a carboxy-containing polymer. In an exemplary embodiment, the functionalized polymer is carboxyl terminated copolymer of butadiene and acetonitrile such as those sold by Emerald Performance Materials LLC, Hexion Specialty Chemicals and Huntsman International LLC. The invention can be practiced by the addition of a pre-formed functionalized polymer to an epoxy resin in situ or by use of a preformed intermediate that includes both the functionalized polymer and the epoxy resin.

One will appreciate that a variety of curing agents (either hardener alone, or hardener in conjunction with a catalyst system) may be used. Suitable curing agents (hardeners or hardeners in conjunction with suitable catalyst(s)) can include, but are not limited to, Dicyandiamide, polyamines, e.g., 3,3'-DDS or 4,4'-DDS, various modified aliphatic and cycloaliphatic amines or adducts, imidazole, substituted imidazole or encapsulated imidazole. In an exemplary embodiment, the resin composition includes dicyandiamide. Dicyandiamide ("dicy") is a popular hardener for epoxies, e.g., for 250° F. cure epoxy systems. It has 4-5 functional amino groups in a cyano structure ($NH_2C(NH)(NHCN)$), and is a precursor to the melamine resin group (CAS 461-58-5).

Suitable catalysts include, but are not limited to, urea and modified urea such as those sold by Air Products and Chemicals, Inc., Dow Chemical Company, Emerald Performance Materials LLC, AlzChem Trostberg GmbH, and AC Catalysts Inc. and imidazoles and modified imidazoles such as those sold by Air Products and Chemicals, Inc. and AC Catalysts Inc. The curing agents may be pre-dispersed in liquid epoxy resin. In various embodiments, the composition includes dicyandiamide such as those sold by companies such as Alzchem Trostberg GmbH, Air Products and Chemicals, Inc., and Emerald Performance Materials LLC. The curing properties, e.g., curing speed of the material of the invention, are readily adjustable by varying the type and the amount of curing agent, or catalyst incorporated into the resin composition. In exemplary embodiments, useful amounts of curing agent and/or catalyst are determined based on typical industrial 250-350° F. curing requirement, so that are compatible with industrial standard 250-350° F. resin systems. By using the same concept in this invention, fast cure surfacing film was also achieved by selecting a curing agent and catalyst, and by adjusting the concentration of the selected curing agent and catalyst in the formulation without sacrificing cure surface quality.

In various embodiments, the resin composition includes a toughening component or agent. An exemplary toughening agent is a polymeric material(s) which can improve the material's fracture toughness and impact resistance, to help prevent fracture or cracking of the cured film. The toughening agent can be liquid or solid. The liquid toughening agent is preferably compatible with and mixable with or soluble in epoxy resins. The solid toughening agent is preferably compatible with and dispersible in epoxy resins. The toughening agent optionally contains various functional groups which can react with matrix resins of the resin composition. The toughening agent of use in this invention includes, but is not limited to, liquid or solid elastic materials having at least one reactive functional group in each molecule (prior to reacting). A suitable reactive functional group includes, but is not limited to, a carboxylic group, a hydroxyl or phenolic group, an amine group, an anhydride group, an isocyanate group, acrylic groups, or combinations of the same. The reactive functional groups react with the matrix resins to form an adduct to impart increased toughness and flexibility to the cured resin. In various embodiments, the toughening agent is present in the total resin composition from about 2% to about 20% by weight, e.g., from about 3% to about 15%, e.g., from about 4% to about 10%. In various embodiments, the amount of toughening agent is from about 3% to about 15%, e.g., about 5% to about 15%, e.g., from about 4% to about 12%, e.g., from about 4% to about 10%, e.g., from about 8% to about 12%. In various embodiments, the functionalized polymer includes a toughening agent or acts as a toughening agent. In an exemplary embodiment, the matrix resin is one or more epoxy resin, such as those sold by Dow Chemical Company, Momentive Performance Materials, Inc. (formerly Hexion Specialty Chemicals, Inc.), Huntsman International LLC, and Emerald Performance Materials LLC., and the toughening agent is a carboxylic acid terminated liquid rubber, such as Hypro 1300X8 and Hypro 1300X13, sold by Emerald Performance Materials LLC.

In various embodiments, the composition of the invention includes one or more filler materials. The filler material includes one or more organic or inorganic fillers. Suitable fillers include, but are not limited to, those used in an adhesive, a sealant, a coating, and the like. Examples of organic fillers include thermoplastic polymer powders made from polyether ketone, polysulfone, and the like and thermoset polymer powders made from cured rubber, acrylic resin, and the like. Examples of inorganic fillers include silica (silicone dioxide), alumina, calcium carbonate, aluminum trihydrate, titanium dioxide, and magnesium hydroxide. Other suitable fillers include, but are not limited to alumina trihydrate powder such as those manufactured by Huber, and fumed silica such as those sold by Evonik Industries. In various embodiments, the filler comprises from at least about 2% to not more than about 80% by weight of the total resin composition. In an exemplary embodiment, the filler content is from about 20% by weight to about 70% (by weight of the total resin composition). In various embodiments, the filler content is from about 25% to about 60% (by weight of the total resin composition). In an exemplary embodiment, the filler is present in an amount of from about 50% to about 70%, e.g., from about 60% to about 70% (by weight of the total resin composition). In an exemplary embodiment, the filler is present in and amount from about 65% to about 70% (by weight of the total resin composition). An exemplary composition of the invention includes filler at about 68.5% (by weight of the total resin composition).

Exemplary fillers of use in the invention include silica, alumina, aluminum trihydrate, carbon black, titanium dioxide, antimony trioxide and zinc borate.

The rheology of the materials of the invention is readily adjustable by varying the amount of filler incorporated into the resin composition. In various embodiments, the filler mixture incorporates fumed silica. In an exemplary embodiment, the amount of silica filler is selected to optimize flow control, and the amount present is from about 1% by weight to about 20% by weight of total resin composition, e.g., about 2% by weight to about 6% by weight of the total resin composition.

In various embodiments, the filler includes a mixture of fillers of different and distinct particle sizes. In the exemplary composition, the fillers include relatively small particles dimensioned to fill the voids between larger particles and achieve higher filler loading while still enabling good flow and fill. E.g., the fillers may include larger particles with a mean particle size of about 5 to about 10 microns, and increasingly smaller particles, e.g., those with a mean particle size from about 5 nanometers to about 60 nanometers. The smaller particles are added during preparation of the resin component until the required filler loading is achieved. Use of different particle sizes may reduce the risk of too high viscosity and dryness. If the particle sizes are not optimized, much of the resin fills the void volume between particles. A mixture of different particle sizes improves wet out at higher filler loadings, because the void volume between larger particles is partially filled with smaller particulates, making more of the resin available for flow and wetout. Thus, less of the resin is held in the void volume between particles and more of the filler is contacted or coated with the resin. Use of the incorrect particle size distribution may result in poor processability, dryness, lack of flow or other undesirable characteristics.

The fillers can be synthesized with spherical morphology or milled or ground from raw material into irregularly shaped particles. In various embodiments, the use of a mixture of particle sizes and shapes ensures a nesting of particles (i.e., smaller particles nesting in the gaps formed by the contact of the larger particles), which allows control of the amount of air or resin that is trapped in the voids between relatively larger particles. The technique of the invention improves the flow and wetout of the resulting formulation. In various embodiments, the average particle size of the filler material is between about 5 nm and about 100 micron. In various embodiments, the filler has an average particle size greater than about 5 nanometers. In various embodiments, the filler has an average particle size less than about 100 micrometers.

In various embodiments, the filler is selected from aluminum trihydrate, fumed silica, $TiO_2$, carbon black, and a combination of the same. In an exemplary embodiment, the filler includes a solid material pre-dispersed or mixed in a liquid epoxy, that essentially remains solid through the cure cycle process of adhesive film melt and flow to cure in a composite part matrix—(i.e., an engineering thermoplastic or thermoset filler which remains solid can act as a filler).

In various embodiments, the "resin composition" is defined as the resin ingredients, fillers, hardeners and catalysts ready to coat onto a substrate. In an exemplary embodiment, the resin composition includes a filler comprising aluminum trihydrate. In various embodiments, the aluminum trihydrate has a mean particle size of about 4.7 micrometers. In an exemplary embodiment, the aluminum trihydrate has an average equivalent diameter ($d_{50}$) of about 4.7 micrometers. In an exemplary embodiment, the aluminum trihydrate has a $d_{90}$ of about 11.6 micrometers. In various embodiments, the filler includes fumed silica with a specific surface area of from about 175 $m^2/g$ to about 225 $m^2/g$, and a mean particle size of about 12 micrometers. In various embodiments, the aluminum trihydrate filler is present at a percent by weight in the final resin/composition of about 1% to about 70% by weight, e.g., about 1% to about 10% by weight.

In various embodiments, the filler comprises $TiO_2$ premixed in liquid epoxy. In various embodiments, the $TiO_2$ premixed in liquid epoxy has a mean particle size of greater than about 100 nm. In various embodiments, the $TiO_2$ has a percent by weight in the final resin composition of about 5% to about 70%.

In various embodiments, the filler comprises carbon black premixed in liquid epoxy. In an exemplary embodiment, the carbon black premixed in epoxy has a specific surface area of about 110 $m^2/g$, and a mean particle size of about 21 nm. In various embodiments, the carbon black is present in a percent by weight in the final resulting resin/composition of about 0.01% to about 10%, e.g., from about 0.1% to about 5%.

In various embodiments, the fillers include particles with a mean primary particle size of about 1 micrometer to about 50 micrometers, e.g., from about 100 nanometers to about 800 nanometers, e.g., from about 10 nanometers to about 80 nanometers, or a combination of these particle size ranges. In various embodiments, the mean primary particle size is less than or equal to about 100 micrometers, e.g., about 1 micrometer to about 30 micrometers. In various embodiments, the maximum particle size is less than or equal to about 60 micrometers.

In various embodiments, the filler comprises particles with a mean primary particle size (numerical average particle size) of about 100 nm to about 50 micrometers, e.g., 20 nm to about 10 micrometers and a maximum particle size less than or equal to about 10 micrometers. Exemplary particles of use in the compositions of the invention are also described by reference to $D_{90}$ particle size (90% of the total particles). In various embodiments, the filler particles have a mean $D_{90}$ particle size of less than or equal to about 10 micrometers. In various embodiments, when $D_{90}$ is larger than 50 micrometers, it becomes more difficult to control the film coating process, therefore, in various embodiments, the $D_{90}$ particle size is less than about 50 micrometers.

In various embodiments, the filler comprises particles with a mean primary particle size of about 5 nm to about 200 nm, e.g., about 10 nm to about 50 nm, and a maximum particle size less than or equal to about 300 nm, e.g., less than or equal to about 100 nm. In various embodiments, the resin composition has a percent by weight filler in the final resin composition of about 1% to about 10%.

In various embodiments, the filler comprises particles with a mean primary particle size of about 1 micrometer to about 10 micrometers, e.g., about 1 micrometer to about 10 micrometers and a maximum particle size less than or equal to about 30 micrometers, e.g., from about 1 micrometer to about 10 micrometers. In various embodiments, the composition includes a percent by weight of filler in the final resin composition of about 1% to about 20%.

In various embodiments, the filler comprises particles with a mean primary particle size of about 5 nm to about 400 nm, e.g., about 10 nm to about 200 nm, and a maximum particle size less than or equal to about 500 nm, e.g., less than or equal to about 300 nm. In various embodiments, the composition includes filler at a percent by weight of the final resin composition of about 0.1% to about 5%.

In the embodiments discussed herein, various particle sizes and distributions of readily available commercial fillers can be blended to provide some packing density to allow higher use of filler without loss in wetout or loss of robustness in the melt's processability. Other combinations will be apparent to those of skill in the art.

In various embodiments, the materials comprise one or more of the above fillers. One will appreciate from the description herein that the filler materials may be provided in any number of combinations to achieve a filler loading and process and performance characteristics.

In various embodiments, the resin composition optionally includes, one or more dispersant or coupling agent to enhance dispersion as well as improve adhesion of the resin to the filler particles. Exemplary dispersants or coupling agents are surfactants which improve the ability of the resin to wet the fillers. One or more dispersant can be added to reduce the viscosity while allowing relatively high filler loading. In exemplary embodiments, the dispersant or coupling agent improves the chemical compatibility between the matrix resin and the filler surfaces. In exemplary embodiments, those dispersants containing chemical functional groups which can react with epoxy resins or catalyze the curing process should be avoided, as they may shorten the surfacing film storage life or work life. Suitable dispersants include, but are not limited to, KenReact KR-385 sold by Kenrich Petrochemicals Inc, and DisperBYK-180, sold by BYK Chemie Gmbh.

In various embodiments, the resin composition includes one or more defoamers (also called air release agent or antifoamer). Defoamers are a surfactant, which changes the surface tension of the liquid system to help resin ingredients wet the fillers as well as release any air bubbles entrapped during mixing and/or during cure to lower the porosity of the cured film. In various aspects, the "surfactants" are referred to generally as a defoamer or air release agent. In various embodiments, the defoamer and/or air release agent is present in the range from about 0.001% to about 5.0% by weight of the total resin composition, a preferred range is from about 0.005% to about 3% by weight of the total resin composition, a more preferred range is from about 0.01% to about 2.0% by weight of the total resin composition. Suitable defoamers or release agents include, but are not limited to, Foamkill products sold by companies such as Crucible Chemical Company, BYK 500 series products sold by BYK Chemie Gmbh, and antifoam products sold by Dow Corning Corporation.

In various embodiments, the resin composition includes one or more pigments. Many pigments are suitable for the resin composition based on the color, opacity, particle size and dispersion ability requirement. Various colored compositions of the invention can be made, in some cases, transparent or black colored materials are desired, while in other cases, it may be desirable to use a colored material with good opacity, rather than a transparent or black material to provide additional protection against the reinforcement fiber becoming visible during sanding. In the case of sanding/repair, the evidence of a lack of pigment aids the operator in making the decision to stop, eliminating risk of further fiber damage. A transparent surfacing film does not give a sanding operator any indication that the operator is sanding too heavily and may be damaging fiber. Similarly, a black surfacing film may not give a visual indicator for a black carbon fiber composite being damaged through sanding. In various embodiments, the pigment is other than transparent, can be black, aqua, red, light yellow, or a combination of the same, and preferably gray, but the pigment is not counted in the resin formulation, we can add any color pigment as needed. In various embodiments, less than 10% pigment is added when needed, while less than 5% pigment is preferred as it will not significantly alter the production process and the cured film properties.

In various embodiments, the composition includes one or more curing agent. Exemplary curing agents include one or more of an initiator, an accelerator, and/or a catalyst. The curing agent may be selected from chemical compounds that can be mixed or dispersed in a liquid or melted in a resin system, at room temperature or high temperature such that no significant curing reaction of the resin composition will take place during the mixing. Exemplary curing agents undergo a further reaction with resins at elevated temperatures to form the cured final film product and impart mechanical strength and sandability. An example of suitable chemical compounds are amine-type curing agents which are often used to cure epoxy resins. One of skill in the chemical and material arts will appreciate from the description herein that other chemical compounds may be selected and provided for this purpose. In various embodiments, the total content by weight of the curing agent, initiator, catalyst, and/or accelerator in the resin composition is between about 0.5% and about 30%. In an exemplary embodiment, the hardener is used in a range of about 2% to about 10% and the catalyst is used in a range of about 0.5% to about 15% by weight of the total resin composition The resin composition is suitable for producing a supported or unsupported film suitable for curing in a composite matrix as a surface that provides cosmetic improvement and is suitable for painting after cure in an otherwise conventional manner. The curing reaction may be based on a polycondensation reaction, a poly-addition reaction, a free radical reaction, or a cationic or anionic reaction. The curing reaction to convert the polymer/filler composition to a cured thermoset and filler composite matrix may be performed with heat. During cure to a thermoset, the functional groups generally react with hardeners with or without a of catalyst, initiator or accelerator to the point where the reaction of essentially >95% of the available reactive functional groups occurs and the resin no longer melts and flows, having been converted from a b-stage mixture to a cured thermoset polymer. One skilled in the art can determine appropriate hardener and catalyst levels to derive a glass transition (Tg) that will approximate the reinforced fiber composite matrix being covered with said surfacing film composition to enhance the surface cosmetics as referenced in this invention. One skilled in the arts can appreciate that the film form of the surfacing film can be formed and shaped to adapt to various contours of a composite part. In an exemplary embodiment, the invention is a 250° F. to 350° F. curing epoxy mixture that cures to a Tg (by DSC, DMA, TMA) of about 100° C.-220° C. in 30-90 minutes. The curing reaction initiated in accordance with the invention results in a cured film within a reasonable period of time in the presence of curing agent, initiator, catalyst, accelerator or a combination of them. The resins can be either liquid or solid with different softening points. In various embodiments, the total resin content in the final product composition is between about 30% and about 80% by weight compared to the supporting carrier. In the preferred embodiment, the resin composition undergoes a polycondensation reaction with amine hardener and urea catalyst or imidazole.

One will appreciate that the resin composition and surfacing film may include any number of the above materials in any combination depending on the application and processing and performance characteristics.

The method of making the film composition and structure in accordance with the present invention will now be described. In various embodiments, the materials above are added in a particular sequence to make sure good mixing, wetting, and dispersion occur. Mixing may be carried out from about room temperature to about 300° F. In general, heating may be used to reduce the system viscosity and improve wetting efficiency to the fillers. In various embodiments, the heating temperature and mixing time parameters are strictly controlled. One will appreciate that different heating temperatures and mixing times may be required at different stages to achieve good mixing without triggering a significant cure reaction or advancing. Generally, liquid epoxies are combined, along with the toughener, lower molecular weight solid epoxies are added, to melt and form the adduct. After the adduction step, higher molecular weight solid epoxy can be added, followed by the defoamer, powder fillers or pre-dispersed fillers prior to hardener and catalyst. In an exemplary embodiment, the higher molecular weight solid epoxy component is added after the adduction to provide more consistent batch-to-batch viscosity results.

In exemplary embodiments, the product is not significantly subject to cure or advancement during the initial product formation phase where it is cast or extruded into a continuous supported film product form. Instead, the product is formulated to be stored for use by a customer, such as laying up the product or applying it to a mold with heat and pressure, to cure it into its final composite shape/purpose.

In exemplary embodiments, the invention provides a film designed to co-cure with various reinforcement fiber prepregs to form laminate composite parts. In various embodiments, these parts are formed from one or more of carbon fiber, glass fiber, Aramid fiber, metal fiber, and/or other organic or inorganic fiber or hybrid fiber(s) and matrix resin. The laminate parts can be made using a unidirectional fiber prepreg with or without a special fiber orientation in the stack of ply configuration. The laminate parts can also be made by woven prepreg with various arrangements of fibers in the woven cloth. Final constructions may contain hollow core members such as honeycomb, thermoplastic or thermoset foam core or foam core in-situ formed by expandable film adhesive or the like to provide body, strength, and stiffness to the hybrid construction containing a surfacing film exterior ply(s).

In various embodiments, the film is configured to be cured at a temperature from about 230° F. to about 350° F. The film may be configured to be compatible with typical industrial-standard 250° F. and 350° F. curing materials. The cured film gives the laminate parts a smooth surface (i.e., no print-through or readout) with relatively few surface defects and minimal surface porosity. In an exemplary embodiment, a surface with minimal surface porosity is a surface that is paint-ready. In an exemplary embodiment, paint-ready refers to a surface requiring little or no reworking, repairing or sanding prior to painting. The film can be cured at a temperature and sufficient pressure or vacuum conditions to form a cured smooth surface which is porosity-free by visual inspection and sandable such that it is ready for a paint preparation. The exemplary cured film is easily treated with or without a sanding process, or directly coated with or without a primer coating without sanding prior to final coating. The cured surfacing film of the invention is compatible with various coatings based on different chemistries such as typical epoxy, polyester, and polyurethane coatings. An exemplary product cures under similar conditions as those products with which it is being combined.

In various embodiments, the mixed resin composition including the curing agent, initiator, catalyst, or accelerator is coated on supporting substrate which may be any of the following, though not limited to, a woven fabric or non-woven reinforcement such as a carrier/veil. Suitable carriers or nonwoven veils can include, but are not limited to, a nylon, polyester, Aramid or other synthetic material, glass, carbon, metal coated fibers, expanded metal mesh, polymeric mat, or thin woven material including, but not limited to, metal, glass, carbon and aramid fiber fabrics. The carrier may have an area weight equal to about 300 g/m$^2$ or less.

In an exemplary process, the mixed resin composition can be applied to the carrier by a film extrusion or metering roll process to form a supported film with even thickness. In other exemplary embodiments, a process such as reverse roll coating or another art-recognized process is utilized. A release liner is optionally applied on one side or both sides of the formed film to protect the film. To extend the shelf life of the coated film, the film may be stored in a refrigerator (e.g., at about 40° F. (4° C.)) or a freezer (e.g., below 0° F. (−18° C.)).

The composition of the invention is of significantly lower viscosity than existing products. Surfacing films with melt viscosities of from about 25 poise to about 200 poise, e.g., from about 50 poise to about 150 poise, e.g., from about 75 poise to about 125 poise are exemplary suitable surfacing films of the invention. Resins having these exemplary viscocity provide improved control of resin mixing and forming of a thin film and controlling the film thickness without deterioration in other performance characteristics. The lowered viscosity also allows use of the resin composition in the composite manufacturing process without a solvent, which is typically necessary with ultra high viscosity resins. By eliminating the use of solvents, the composition and method of use avoids several problems present in solvent-based techniques such as under-drying and the risk of increased tack and blistering from solvent outgassing during molding or paint cure with heat, over-drying, which can overstage the material, resulting in a loss of tack, loss of drapability leading to molding defects and structural weakness. The invention also avoids the use and disposal of volatile solvents. Accordingly, the invention provides a method of casting an epoxy resin without the use of a solvent as well as such cast resins and laid up articles of manufacture incorporating such resins in either a cured or non-cured state.

One will appreciate that the materials and methods of the invention allow for use of a wide range of materials in a hot melt manufacturing process. The invention provides a thermosetting resin in a relatively low viscosity range amenable to hot melt processing without the processing limitations of existing materials. The thermosetting resin results in a good performing film. The film of the invention has a long out time (e.g., more than 3 weeks) at room temperature, (room temperature out time defined as retaining its drapeability and tack over time) thus enabling its use for large scale structures which can take many days to lay up, and the cured surface is sandable with low porosity, which makes the surface easier to paint. The resin composition and resulting surfacing film of the invention also provides more robust post-processing such as painting or sealing coats—cosmetic or functional coatings to seal out weather, moisture, UV damage, etc.—in addition to painting for visual appeal such as logos and color scheme.

Suitable support carriers or reinforcement include, but are not limited to, woven and non-woven carriers comprising polyester fiber, nylon fiber, glass fiber, aramid fiber, carbon fiber, and combinations of the same. In this product, the support or carrier is not a separate film (i.e., release carrier) but an integrated support framework of fibers, either polymer or inorganic, random or woven to provide stability in the film matrix while handling large sheets, placing and laying up on large support structures and the like. Exemplary carriers include those sold by Technical Fiber Products, Inc., Precision Fabrics Group, and Cerex Advanced Fabrics, Inc. In an exemplary embodiment, a low weight polyester veil over glass or other mineral sheets which contain higher density fibers is utilized.

EXAMPLES

The invention is further illustrated by the Examples that follow. The Examples are not intended to define or limit the scope of the invention.

Example 1

Several reactant resin mixtures for forming surfacing films with good opacity were prepared with the following component contents:
1. A liquid epoxy resin or a mixture of liquid epoxy resins selected from low viscosity liquid epoxy resins, about 5 to 60% in weight;
2. One or more solid bisphenol A based epoxy resin which has a softening point range from 50° C. to 130° C., about 2% to 40% in weight;
3. Solid epoxy phenol novolac, epoxy cresol novolac or other multifunctional epoxy resin with a functionality of about 2.2 or more, about 1-30% by weight;
4. Carboxylic functionalized butadiene-acrylonitrile copolymer with average functionality of about 2 or more than 2, 1-20% by weight;
5. Defoamer or air release agent: about 0.001% to about 5%;
6. One, two or three fillers and pigments selected from silica, aluminum hydroxide, alumina, carbon black, titanium dioxide, calcium carbonate, average particle size from 5 nm to 100 micron, preferably range of the weight percentage is from about 20% to 60%, with or without organic surface treatment;
7. Curing agent dicyandiamide (Dicy) from about 2% to about 10%; and
8. Accelerator or catalyst selected from urea, substituted urea, imidazole, modified imidazole, tertiary amine: from about 0.5% to about 5%.

Optimizing Filler Packing Density

| | Filler Amount | Filler Size Range |
|---|---|---|
| #1 | ~1 to 35% | 5 to 50 nm (0.005-0.05 microns) |
| #2 | ~25 to 70% | 100-800 nm (0.1 to 0.8 microns) |
| #3 | ~5-35% | 1,000 to 40,000 nm (1 to 40 microns) |

A comparison of the films with high, medium and low viscosities is summarized in the following table

TABLE 1

| Exper. No. | Viscosity at 160° F. (71° C.) Pa·s | Hot melt mixing ability | Coating film | Thin film thickness control and adjustability | Coated film | Cured film[b] Appear. | Porosity or pinhole free[c] | Sand ability | Trace of streaks |
|---|---|---|---|---|---|---|---|---|---|
| 1 | 66[a] | Difficult | Poor | Difficult | Uneven | — | — | — | — |
| 2 | 59[a] | Difficult | OK | Difficult | Uneven | Smooth | Yes | Yes | Yes |
| 3 | 46 | Good | Good | Good | Very uniform | Smooth | Yes | Good | No |
| 4 | 37 | Good | Good | Good | Very uniform | Smooth | Yes | Good | No |

[a] Viscosity difficult to handle: can not get good wetting and dispersion of the fillers and pigments
[b] 10 plys of typical commercial carbon fiber unidirectional prepreg, one ply surfacing film on top, standard layup and vacuum bagging procedure and cured in auto clave 90 min at 275° F. (135° C.) at 40 psi
[c] Visual inspection Competitive Example An epoxy based competitive product is analyzed and summarized in the table below.

TABLE 2

| Experiment No | Viscosity at 160° F. (71° C.) Pa·s | Hot melt mixing ability | Coating film | Thin film thickness control and adjustability | Coated film | Cured film[e] Appearance | Porosity or pinhole free | Sand ability | Trace of streaks |
|---|---|---|---|---|---|---|---|---|---|
| 5 | Over the limit[d] | Unprocessable by hot melt | Must have to use solvent | OK with solvent | OK with solvent | Smooth | Yes | Good | No |

(a) The viscosity was over the limit of the rheometer, which means the viscosity is at least 15 times higher than that of Experiment 1
(b) Same condition as (b), i.e., 10 plies of typical commercial carbon fiber unidirectional prepreg, one ply surfacing film on top, standard layup and vacuum bagging process and cured in auto clave 90 min at 275° F. (135° C.) at 40 psi The resin mixture and surfacing film were generally prepared using the following process. First, components (1) through (4) were mixed and reacted at about 240° F. to about 290° F. for about 1 hour to about 10 hours to make an in-situ adduct. The adducting process was found to approximately double the viscosity of the mixture.

Next, components (5) and (6) were added to the mixture. The mixture was heated and mixed until it became essentially homogeneous. Although the fillers and pigments were added separately (i.e., step-by-step in sequences), it is possible to add all of the fillers and pigments at one time to the mixture. Pre-dispersed/mixed fillers and pigments with resins may also be used. It may be desirable to ensure proper mixing such that the fillers and pigment are well wetted and homogeneously dispersed to improve performance of the final film.

Next, component (7) was added to the reactant mixture at temperatures at which the system (mixture) was relatively easy to mix without triggering significant curing or advancing, which is would be understood by one of skill in the chemical and material arts.

After mixing the curing agent into the system, an accelerator or catalyst was optionally added. Similar to the curing agent, the accelerator or catalyst is added at a sufficient temperature to improve mixing without triggering significant curing or advancing.

The resin composition (reactant mixture) was immediately used to make a surfacing film after preparation. The surfacing film was coated on a non-woven carrier by a calendaring/metering process to form a supported composite film with essentially even and uniform thickness. A release liner was applied on one side or both sides of the formed film to protect the film. After metering/coating the material is cooled to room temperature, thereby maintaining coating and preventing advancement. The coated film was then sealed, packaged, and stored at 0° F. (−18° C.) for subsequent cure and use in making composite parts.

Based on the above process, several compositions were formed. The product properties were measured and are reported in Table 1. Comparative examples are shown in Table 2.

With reference to Table 1, four resin compositions with relatively high, medium and low viscosities were made by adjusting the ratios of adduct, liquid and solid resins, and the fillers. To compare the processability of each, the viscosities of the resins were measured by a rheometer at 160° F. (71° C.). The viscosity was in the range of about 30 Pa·s to about 70 Pa·s. It was determined that a viscosity above 100 Pa·s would be difficult to control and use to make a film with satisfactory characteristics under typical hotmelt manufacturing coating conditions.

Formulations 1 and 2 were difficult to mix due to high viscosity. The fillers were not fully wetted and clumps of dry particles were observed in the mix. The film could be coated with formulation 2 and the surface was smooth and porosity free, but the cured film showed uneven distribution of the fillers. The films coated with formulations 3 and 4 had good tackiness and were relatively easy to handle/work during layup. The films had more than three weeks out time, i.e., they still had good tackiness after three weeks of exposure to ambient temperature. The film was curable at 250° F./350° F. (121° C., 177° C.). The film was applied to the outside surface of a laminate and co-cured with a composite prepreg of like cure conditions to become part of a final laminate structure. After cure, formulations 3 and 4 provided good aesthetics with porosity free surfaces. The cured surfaces have low surface roughness and line free. The cured film surfaces were easy to sand.

Example 2

Several reactant resin mixtures for forming surfacing films with semi-transparent or black color were prepared with the following components:
1. A liquid epoxy resin or a mixture of liquid epoxy resins selected from low viscosity liquid epoxy resins, about 5 to 60% in weight;
2. One or more solid bisphenol A based epoxy resin which has a softening point range from 50° C. to 130° C., about 2% to 40% in weight;
3. Solid epoxy phenol novolac, epoxy cresol novolac or other multifunctional epoxy resin with a functionality of about 2.2 or more, about 1-30% by weight;
4. Carboxylic functionalized butadiene-acrylonitrile copolymer with average functionality about 2 or more than 2, 1-20% by weight;
5. A defoamer/air release agent selected from Foamkill products sold by Crucible Chemical Company, BYK 500 series products sold by BYK Chemie Gmbh, and antifoam products sold by Dow Corning Corporation: about 0.001% to about 5%;
6. One, two or three fillers and pigments selected from, alumina, aluminum hydroxide, magnesium oxide, zinc borate, zinc-magnesium complex, zinc stannate based compound, antimonite trioxide, carbon black, yellow pigment, red pigment, and calcium carbonate or a combination thereof, average particle size from 5 nm to 100 micron, preferably range of the weight percentage is from about 20% to 60%, with or without organic surface treatment;
7. Curing agent dyciandiamide (Dicy) from about 2% to about 10%; and
8. Accelerator or catalyst selected from urea, substituted urea, imidazole, modified imidazole, tertiary amine: from about 0.5% to about 5%.

TABLE 3

| Exper. No. | Thixotrpoic index at 160° F. (71° C.) | Hot melt mixing ability | Coating film | Thin film thickness control and adjustability | Coated film | Cured film[c] | | | |
|---|---|---|---|---|---|---|---|---|---|
| | | | | | | Appear. | Porosity or pinhole free[d] | Sand ability | Trace of streaks |
| 6 | High | Poor | OK | Difficult[a] | Uniform | Smooth | Yes | Good | No |
| 7 | High | Poor | OK | Difficult[a] | Uniform | Smooth | Yes | Good | No |
| 8 | Medium | Good | Good | Good[b] | Very uniform | Smooth | Yes | Good | No |
| 9 | Low | Good | Good | Good[b] | Very uniform | Smooth | Yes | Good | No |

[a]Difficult to mix and difficult to coat thin film and control the thin film thickness;
[b]Easy to mix and easy to control the thin film thickness, the film areal weight can be as low as 0.010 psf (lbs/ft$^2$) (50 g/m$^2$);
[c]10 plys of typical commercial carbon fiber unidirectional prepreg, one ply surfacing film on top, standard layup and vacuum bagging procedure and cured in auto clave 90 min at 275° F. (135° C.) at 40 psi;
[d]By visual inspection The resin mixture and surfacing film were generally prepared using the following process. First, components (1) through (4) were mixed and reacted at about 240° F. to about 290° F. for about 1 hour to about 10 hours to make an in-situ adduct. The adducting process was found to approximately double the viscosity of the mixture.

Next, components (5) and (6) were added to the mixture. The mixture was heated and mixed until it became essentially homogeneous. Although the fillers and pigments were added separately (i.e., step-by-step in sequences), it is possible to add all of the fillers and pigments at one time to the mixture. Pre-dispersed/mixed fillers and pigments with resins may also be used. It may be desirable to ensure proper mixing such that the fillers and pigment are well wetted and homogeneously dispersed to improve performance of the final film.

Next, component (7) was added to the reactant mixture at temperatures at which the system (mixture) was relatively easy to mix without triggering significant curing or advancing, which is would be understood by one of skill in the chemical and material arts.

After mixing the curing agent into the system, an accelerator or catalyst was optionally added. Accelerator or catalyst is selected from urea, substituted urea, imidazole, modified imidazole or tertiary amine. Similar to the curing agent, the accelerator or catalyst is added at a sufficient temperature to improve mixing without triggering significant curing or advancing.

The resin composition (reactant mixture) was immediately used to make a surfacing film after preparation. The surfacing film was coated on a non-woven carrier by a calendaring/metering process to form a supported composite film with essentially even and uniform thickness. A release liner was applied on one side or both sides of the formed film to protect the film. After metering/coating the material is cooled to room temperature, thereby maintaining the coating and preventing advancement. The coated film was then sealed, packaged, and stored at 0° F. (−18° C.) for subsequent cure and use in making composite parts.

Based on the above process, several compositions were formed. The product properties were measured and are reported in Table 3.

With reference to Table 3, four resin compositions with relatively high, medium and low Thixtropic Index were made by adjusting the ratios of adduct, liquid and solid resins, and the fillers. To compare the processability of each, the Thixtropic Index of the resins were measured by a rheometer at 160° F. (71° C.). It was determined that a high Thixotropic Index would be difficult to control and use to make a film with satisfactory characteristics under typical hotmelt manufacturing coating conditions.

Formulations 6 and 7 were difficult to mix due to high Thixtropic Index. The fillers were not fully wetted and clumps of dry particles were observed in the mix. The film could be coated with formulation 6 and 7 and the surface was smooth and porosity free, but the cured film showed uneven distribution of the fillers and difficult to make thin film. Formulations 8 and 9 were easy to handle, the film thicknesses (areal weight) were easy to control, within the film thickness range from as high as 0.150 psf (lbs/sf$^2$) or 730 g/m$^2$ to as low as 0.010 psf (lbs/sf$^2$) or 50 g/m$^2$. The films coated with formulations 8 and 9 had good tackiness and were relatively easy to handle/work during layup. Thicker films are preferred due to the easy handling and higher productivity. The films had more than three weeks out time, i.e., they still had good tackiness after three weeks of exposure to ambient temperature. The film was 250° F./350° F. (121° C./177° C.) curable. The film could be applied on the outside surface of a laminate and co-cured with a composite prepreg of like cure conditions to become part of a final laminate structure. After cure, formulations 8 and 9 provided good aesthetics with semi-transparent or black color and porosity free surfaces. The cured surfaces on various composite parts with different cure methods have shown low roughness and mirror like surfaces. The cured film surfaces were easy to sand. In a sanding test, the cured 0.150 psf (lbs/sf$^2$) or 730 g/m$^2$ surfacing film on a carbon fiber laminate were easily able to completely sand down to the carbon layer. With a slightly sanding, the formulations 8 and 9 showed good compatibility and adhesion with a commercial industrial coating which is widely used in composite painting.

Example 3

This material was prepared in a manner similar to that of Example 2,
1. The mixed resin was partially replaced by a brominated epoxy resin by about 20% to about 50%;
2. Defoamer or air release agent selected from Foamkill products sold by companies such as Crucible Chemical Company, BYK 500 series products sold by BYK Chemie Gmbh, and antifoam products sold by Dow Corning Corporation: about 0.001% to about 5%;
3. One, two or three fillers and pigments selected from, alumina, aluminum hydroxide, magnesium oxide, zinc borate, zinc-magnesium complex, zinc stannate based compound, antimonite trioxide, carbon black, yellow pigment, red pigment, and calcium carbonate or a combination thereof, average particle size from 5 nm to 100 micron, preferably range of the weight percentage is from about 20% to 60%, with or without organic surface treatment;
4. Curing agent dicyandiamide (Dicy) from about 2% to about 10%; and
5. One or two accelerator or catalyst selected from urea, substituted urea, imidazole, modified imidazole, tertiary amine: from about 0.5% to about 5%.

The same resin mixing procedure and film coating process used in Examples 1 and 2 were employed in Example 3. The resin composition (reactant mixture) was immediately used to make a surfacing film after preparation. The surfacing film was coated on a woven or a non woven glass carrier by a calendaring/metering process to form a supported composite film with essentially even and uniform thickness. A release liner was applied on one side or both sides of the formed film to protect the film. After metering/coating the material is cooled to room temperature, thereby maintaining coating and preventing advancement. The coated film was then sealed, packaged, and stored at 0° F. (−18° C.) for subsequent cure and use in making composite parts.

Based on the above process, several compositions were formed. The product properties were measured and are reported in Table 4.

TABLE 4

| Exper. No | Contains defoamer | Hot melt mixing ability | Coating film | Thin film thickness control and adjustability | The laminate passes FST test (a) | Coated film | Cured film[b] | | | |
|---|---|---|---|---|---|---|---|---|---|---|
| | | | | | | | Appear. | Porosity or pinhole free[c] | Sand ability | Trace of streaks |
| 10 | No | Good | OK | Good | Yes | Uniform | Smooth | OK | Good | No |
| 11 | Yes | Good | OK | Good | Yes | Uniform | Smooth | Excellent[d] | Good | No |

(a) FST: flammability and smoke density test including the following tests FAR 25.853 Appendix F, Part I (a)(1)(i) and (a)(2)(iii) FAR 25.853 Appendix F, Part IV (OSU Heat Release Rate) FAR 25.853 Appendix F, Part IV (OSU Heat Release Rate)
[b]The laminates were made by using typical Newport Adhesives and Composites' special flame retardant carbon fiber unidirectional prepreg (please refer to Newport 4030 Product Datasheet), with one ply flame retardant surfacing film on top, standard layup and vacuum bagging procedure and cured in auto clave 90 min at 275° F. (135° C.) at 40 psi
[c]By visual inspection With reference to Table 4, two resin compositions with and without defoamer (Formulations 10 and 11) were made by adjusting the ratios of brominated epoxy resin content, and the flame retardant content. It was determined that a defoamer/air release agent is needed to provide a film with satisfactory characteristics under typical hotmelt manufacturing coating conditions.

Formulations 10 and 11 were easy to mix. The film thickness (wt/area) was easy to control, within the film thickness range from as high as 0.150 psf (lbs/sf$^2$) or 730 g/m$^2$ to as low as 0.010 psf (lbs/sf$^2$) or 50 g/m$^2$. The films made from formulations 10 and 11 had good tackiness and were relatively easy to handle/work during layup. Films thicker than 20 psf (lbs/sf$^2$) are of particular utility due to the easy handling and higher productivity. The films were still fully functional after more than three weeks out time, i.e., they still had good tackiness after three weeks of exposure to ambient temperature. The film was curable at 250° F./350° F. (121° C./177° C.). The film could be applied to the outside surface of a laminate and co-cured with a composite prepreg curable under similar conditions to become part of a final laminate structure. After cure, formulations 10 and 11 provided good aesthetics with semi-transparent or black color and porosity free surfaces while formulation 11 showed better leveling property than formulation 10. The cured surfaces on various composite parts with different cure methods have shown low roughness without fiber print through. The cured film surfaces were easy to sand. With a slight sanding, the formulations 10 and 11 showed good compatibility and adhesion with a commercial industrial coating which is widely used in composite painting. The surfacing film co-cured with Newport Adhesives and Composites, Inc.'s special flame retardant prepregs pass the FST test (FAR flammability and smoke density test, i.e., FAR 25.853 Appendix F, Part I (a)(1)(i) and (a)(2)(iii), FAR 25.853 Appendix F, Part IV (OSU Heat Release Rate), and FAR 25.853 Appendix F, Part IV (OSU Heat Release Rate)).

Example 4

To make a fast cure surfacing film, the method of Example 1, steps 7 and 8, was utilized with one or two curing agent(s) and accelerator(s) selected from urea, substituted urea, imidazole, substituted imidazole, amine, substituted amine, tertiary amine in an amount of from about 5% to about 30%.

Formulations 12 and 13 were easy to handle, the film thicknesses (areal weight) were easy to control, within a film thickness range from as high as 0.150 psf (lbs/sf$^2$) or 730 g/m$^2$ to as low as 0.020 psf (lbs/sf$^2$) or 50 g/m$^2$. The films coated with formulations 12 and 13 had good tackiness and were relatively easy to handle/work during layup. Thicker films are preferred due to the easier handling and higher productivity. The films still had useful characteristics after more than two weeks out time, i.e., they still had good tackiness after three weeks of exposure to ambient temperature. The films were 250° F./350° F. (121° C./177° C.) curable with fast cure capability. The film could be applied on the outside surface of a laminate and co-cured with a composite prepreg of like cure conditions to become part of a final laminate structure. After cure, formulations 12 and 13 provided good aesthetics with semi-transparent or black color and porosity free surfaces. The cured surfaces on various composite parts with different cure methods have shown low roughness smooth surfaces without the fiber print-through. The cured film surfaces were easy to sand.

TABLE 5

| Exper. No | Percentage of curing agent(s)[a] | Hot melt mixing ability | Coating film | Thin film thickness control and adjustability | Coated film | Differences in DSC Onset and Peak temperatures | Cured film[e] | | | |
|---|---|---|---|---|---|---|---|---|---|---|
| | | | | | | | Appear. | Porosity or pinhole free[e] | Sand ability | Trace of streaks |
| 12 | 8%[b] | Good | OK | Good | Uniform | 125° C.[c] 143° C.[d] | Tacky | Yes[d] | Good | No |
| 13 | 10%[b] | Good | OK | Good | Uniform | 120° C. 138° C. | Smooth Tacky free | Yes[d] | Good | No |

[a]The concentration of the curing agent(s) is the total amount of the curing agent and accelerator selected from the group of the materials described in paragraph 83.
[b]Percentage of the curing agent by weight of the total resin composition.
[c]DSC onset temperature for the mixed resin of formulation 12 was measured by a Perkin Elmer Diamond DSC.
[d]DSC peak temperature for the mixed resin of formulation 12 was measured by a Perkin Elmer Diamond DSC.
[e]10 plys of typical commercial carbon fiber unidirectional prepreg, one ply surfacing film on top. The material was cured with preheated hot press, 6 minutes at 300° F., hot-in hot-out with 40 psi pressure.

The same resin mixing procedure and film coating process used in Examples 1 and 2 were employed in Example 4. The resin composition (reactant mixture) was immediately used to make a surfacing film after preparation. The resin composition swan coated on a woven or a non woven glass carrier by a calendaring/metering process to form a supported composite film with essentially even and uniform thickness. A release liner was applied on one side or both sides of the formed film to protect the film. After metering/coating the material is cooled to room temperature, thereby maintaining coating and preventing advancement. The coated film was then sealed, packaged, and stored at 0° F. (−18° C.) for subsequent cure and use in making composite parts.

Based on the process described above, several compositions were formed. The product properties were measured and are reported in Table 5.

With reference to Table 5, two resin compositions with relatively low and high curing speed were made by adjusting the ratios of resins and the curing agent/catalyst. The DSC onset and peak temperatures measured by a Perkin Elmer Diamond DSC with 10° C./min ramping rate were employed as indicators to compare the curing speed. It was determined that DSC onset and peak temperature could be used as an indicator for fast cure capability, and lower DSC onset and peak temperatures would give faster cure performance.

With a slight sanding, the formulations 12 and 13 showed good compatibility and adhesion with a commercial industrial coating which is widely used in composite painting. In a fast cure test using two laminate panels, one was covered during layup with formulation 12 surfacing film, the other was covered during layup with formulation 13 surfacing film. Both samples were cured for 5~6 minutes with a pre-heated hot press at 300° F., in a hot-in hot-out process. Formulation 13 was well cured with excellent surface quality and the cured surface was completely tack free, while formulation 12 provided the same surface appearance but with a little tack, which means formulation 12 could not be fully cured within 5~6 minutes range at this temperature, suggesting that higher curing agent content is needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A resin composition for forming a thermosetting surfacing film, the composition comprising:
   a resin component comprising one or more epoxy resins selected from a liquid resin, a solid resin, a semi-solid resin and a combination thereof;
   from about 1% to about 20% (by weight of the total composition) of a carboxylic acid functionalized polymer having an average functionality of about 2 or more carboxylic acids prior to reacting said polymer with said resin component;
   from about 2% to less than 25% (by weight of the total composition), with or without an organic surface treatment, of a filler material, comprising 2 or more fillers and optionally one or more pigments, wherein the first filler has a mean primary particle size of from about 5 nm to about 60 nm and is present in said composition in an amount of from about 1% to about 10% (by weight of the total composition), and the second filler is different from the first filler and has a mean primary particle size of about 1 to about 30 microns,
   said resin composition having a viscosity of less than about 100 Pa·s at 71° C., and being free of solvent.

2. The composition of claim 1, wherein the one or more epoxy resins comprises:
   (A) from about 5% to about 60% (by weight of the total composition) of a resin fraction selected from a low viscosity liquid epoxy resin, and a combination of said low viscosity liquid epoxy resin with one or more resin selected from a solid resin, and a semi-solid;
   (B) from about 2% to about 40% (by weight of the total composition) of one or more solid bis-phenol A based epoxy resins having a softening point range from about 50° C. to about 130° C.; and
   (C) from about 1% to about 30% (by weight of the total composition) of solid epoxy phenol novolac or epoxy cresol novolac having a functionality of about 2.2 or more.

3. The composition of claim 1, further comprising:
   (D) from about 0.001% to about 5% (by weight of the total composition) of a defoamer and/or air release agent.

4. The composition of claim 1, further comprising:
   (F) from about 2% to about 10% (by weight of the total composition) of a curing agent.

5. The composition of claim 1, further comprising:
   (G) from about 0.5% to about 5% (by weight of the total composition) of an accelerator or catalyst selected from a urea, a substituted urea, an imidazole, a substituted imidazole, a tertiary amine and a combination thereof.

6. A solvent-free surfacing resin composition which is prepared by:
   (A) reacting,
      (1) from about 5% to about 60% (by weight of the total composition) of a resin fraction selected from a low viscosity liquid epoxy resin and a combination of said low viscosity liquid epoxy resin, with one or more resin selected from a solid resin, and a semi-solid resin;
      (2) from about 2% to about 40% (by weight of the total composition) of one or more solid bis-phenol A based epoxy resins having a softening point range from about 50° C. to about 130° C.;
      (3) from about 1% to about 30% (by weight of the total composition) of solid epoxy phenol novolac or epoxy cresol novolac having an average functionality of about 2 or more; and
      (4) from about 1% to about 20% (by weight of the total composition) of a carboxylic acid functionalized polymer;
   thereby forming an adduct; and
   (B) mixing with said adduct,
      (1) from about 0.001% to about 5% (by weight of the total composition) of a defoamer and/or air release agent; and
      (2) from about 2% to less than 25% (by weight of the total composition), with or without an organic surface treatment, of a filler material comprising 2 or 3 fillers and optionally one or more pigments, wherein the first filler has a mean primary particle size of from about 5 nm to about 60 nm and is present in said composition in an amount of from about 1% to about 10% (by weight of the total composition), and the second filler is different from the first filler and has a mean primary particle size of about 1 to about 30 microns,
      (3) from about 2% to about 10% (by weight of the total composition) of a curing agent; and
      (4) from about 0.5% to about 5% (by weight of the total composition) of an accelerator or catalyst selected from a urea, a substituted urea, an imidazole, a substituted imidazole, a tertiary amine and a combination thereof,
   thereby forming said resin composition.

7. A solvent-free film product formed from the surfacing resin composition of claim 6, said product formed by a method comprising:
   (i) applying or coating the surfacing resin to a carrier to form a film product; and
   (ii) after the applying, cooling the film product.

8. The solvent-free surfacing resin composition of claim 6, wherein the carboxylic acid functionalized polymer has an average functionality of equal to or greater than about 2.

9. The solvent-free surfacing resin composition of claim 6, wherein the carboxylic acid functionalized polymer is a di-carboxylic acid functionalized polymer.

10. The solvent-free surfacing resin composition of claim 6, wherein the composition has a viscosity from about 20 Pa·s to about 100 Pa·s.

11. The resin composition according to claim 1, wherein the first filler is fumed silica with a mean primary particle size of about 12 nanometers.

12. The resin composition according to claim 11, wherein the fumed silica has a specific surface area of from about 175 $m^2/g$ to about 225 $m^2/g$.

13. The resin composition according to claim 1, wherein the second filler has a D90 particle size of less than about 10 microns.

14. The resin composition according to claim 1, wherein the first filler has a mean primary particle size of from about 10 nm to about 50 nm.

15. The resin composition of claim 1, wherein the filler material comprises from about 2% to less than 20% of the total composition (by weight).

16. The resin composition of claim 6, wherein the filler material comprises from about 2% to about 20% of the total composition (by weight).

17. The resin composition of claim 1, wherein the second filler is aluminum trihydrate at a concentration of about 15% of the total composition (by weight).

* * * * *